United States Patent [19]

Hirt et al.

[11] Patent Number: 5,055,279

[45] Date of Patent: Oct. 8, 1991

[54] PROCESS FOR THE REDUCTION OF EMISSIONS OF SULPHUR DIOXIDE AND/OR OXIDES OF NITROGEN IN THE CASE OF COMBUSTION PROCESSES

[75] Inventors: Hans-Dieter Hirt, Oyten; Peter Reinemann, Syke/Ristedt, both of Fed. Rep. of Germany

[73] Assignee: SKW Trostberg Aktiengesellschaft, Trostberg, Fed. Rep. of Germany

[21] Appl. No.: 503,710

[22] Filed: Apr. 3, 1990

[30] Foreign Application Priority Data

May 20, 1989 [DE] Fed. Rep. of Germany ....... 3916522

[51] Int. Cl.$^5$ ..................... C01B 17/00; C01B 21/00; B01J 8/00
[52] U.S. Cl. .................................... 423/239; 423/244
[58] Field of Search ............... 423/239, 239 A, 244 R, 423/244 A

[56] References Cited

U.S. PATENT DOCUMENTS 4,770,863  9/1988  Epperly et al. ..................... 423/235

FOREIGN PATENT DOCUMENTS 2926107  1/1981  Fed. Rep. of Germany.
3447616  7/1985  Fed. Rep. of Germany.

*Primary Examiner*—Gregory A. Heller
*Attorney, Agent, or Firm*—Felfe & Lynch

[57] ABSTRACT

The present invention provides a process for the reduction of emissions of sulphur dioxide and/or of oxides of nitrogen in the case of combustion processes by the addition of hydrated calcium cyanamide, wherein hydrated particles of calcium cyanamide enveloped with a hydrate mantle are blown from a mixing nozzle into the combustion chamber, with the help of a carrier medium comprising air, water and water vapor, in the form of a droplet-powder fluidized bed.

10 Claims, No Drawings

PROCESS FOR THE REDUCTION OF EMISSIONS OF SULPHUR DIOXIDE AND/OR OXIDES OF NITROGEN IN THE CASE OF COMBUSTION PROCESSES

FIELD OF THE INVENTION

The present invention is concerned with a process or the reduction of emissions of sulphur dioxide and/or of oxides of nitrogen in the case of combustion processes.

BACKGROUND OF THE INVENTION

A process for the reduction of the emission of sulphur dioxide and/or of oxides of nitrogen in the case of combustion processes by the addition of an additive based on hydrated calcium cyanamide, optionally in admixture with further reactive calcium compounds, into a combustion chamber is described in Federal Republic of Germany Offenlegungsschrift No. 38 23 848.

Published Federal Republic of Germany Patent Specification No. 29 26 107 describes a process for the separation of nitrogen oxides and possibly of halogens, sulphur and/or halogen compounds from gases in which the gases are passed, in the presence of water, over a cyanamide or through a suspension or solution of the cyanamide at a temperature of from 0° to 80°C. and the harmful materials are separated off. Because of the high cost of the apparatus, this process could not be used technically.

Also known are processes which recommend the use of urea and lime for the non-catalytic removal of emissions of oxides of nitrogen or sulphur dioxide.

OBJECT OF THE INVENTION

However, all these known processes suffer from technical deficiencies. Therefore, it is an object of the present invention to provide a process of the said kind which only requires a small technical expense and enables the achievement of a high percentage removal of the harmful materials.

DESCRIPTION OF THE INVENTION

Thus, according to the present invention, there is provided a process for the reduction of emissions of sulphur dioxide and/or of oxides of nitrogen in the case of combustion processes by the addition of hydrated calcium cyanamide, wherein hydrated particles of calcium cyanamide enveloped by a hydrate mantle are blown from a mixing nozzle into the combustion chamber, with the help of a carrier medium comprising air, water and water vapor, in the form of a droplet-powder fluidized bed.

The present invention is based on the ascertainment that hydrated calcium cyanamide as additive for the reduction of acidic harmful materials from combustion procedures achieves an optimum reactivity when particles of hydrated calcium cyanamide enveloped by a hydrate mantle are introduced via a mixing nozzle, with the help of a particular carrier medium, in finely dispersed and uniformly distributed form.

With the help of the process according to the present invention, there is achieved an especially high reduction of oxides of sulphur and nitrogen. The additive is preferably blown in with a carrier and propellent gas medium comprising air, water vapor and water via a variable mixing nozzle of known constructional type. It is hereby of especial importance that the individual particles of the hydrated calcium cyanamide are coated during the conveying with a practically unbroken hydrate covering, for which purpose merely the addition of an appropriate amount of water to the carrier-driving gas medium is necessary. Alternatively, however, there can be used particles which are already completely or partly enveloped with water and these mixed with the carrier medium. The particles enveloped with water in this way form, after leaving the nozzle, a droplet-powder fluidized bed in the combustion chamber. In the combustion chamber they are explosively dehydrated, which effects a breaking up of the particles of the hydrated calcium cyanamide, in which case a 10 to 1000 times greater effective particle surface results.

It is decisive in the case of this dispersion via a thermal explosion that the particles do not move in a linear direction given by the nozzle but are comprehensively and uniformly distributed in the combustion chamber. For this purpose, as carrier medium for the additive, besides air and water, as water vapor there is preferably used saturated steam or superheated steam. The ratio thereof to the co-used water is preferably from 10:1 to 1:10 and the pressure used is preferably in the range of from 3 to 10 bar.

The amount of hydrated calcium cyanamide and carrier medium can be varied depending upon the combustion chamber conditions and upon the composition of the waste gases and can be optimally adjusted by a few simple preliminary experiments. In general, amounts of calcium cyanamide of 0.5 to 10 g./Nm$^3$ of waste gas and preferably of from 1 to 5 g./Nm$^3$ have proved to be useful. The particle size is preferably < 250 μm. and especially preferably < 160 μm. down to 10 μm.

With the process according to the present invention, there is already achieved a reduction of the amounts of sulphur dioxide and/or oxides of nitrogen in the waste gases above a temperature of 300°C. The process can be used up to a combustion chamber temperature of 1200°C.

The following Examples are given for the purposes of illustrating the present invention:

EXAMPLE 1

In a special mill combustion for mixtures of organic solvents with heavy oil support firing, there results an amount of flue gas of 15,000 Nm$^3$/hour. The content of oxygen in the waste gas amounts to 9% and the content of oxides of nitrogen to 736 mg./Nm$^3$. Hydrated calcium cyanamide (particle size 90% < 160 μm.) is blown into the combustion chamber in an amount of 75 kg./hour with carrier air, saturated water vapor and water. The content of oxides of nitrogen in the waste gas is reduced to 175 mg./Nm$^3$, which corresponds to a degree of nitrogen removal of about 76%.

EXAMPLE 2

In a grate-fired solid material kettle for the combustion of organic residues from the manufacture of paper, there is produced a flue gas volume stream of 17,800 Nm$^3$/hour. In the waste gas, the oxygen content amounts to about 6.5%, the content of oxides of nitrogen to 475 mg./Nm$^3$ and the content of sulphur dioxide to 2450 mg./Nm$^3$. Hydrated calcium cyanamide (particle size 90% < 160 μm.) is blown into the combustion chamber in an amount of 60 kg./hour with carrier air, saturated water vapor and water. The content of oxides of nitrogen in the waste gas is reduced to 70 mg./Nm$^3$ and the content of sulphur dioxide to 1950 mg./Nm$^3$ which corresponds to a degree of nitrogen removal of about 85% and to a degree of sulphur removal of about 20%.

EXAMPLE 3

In a lignite-fired kettle, in the case of the combustion of 12 ton of lignite per hour, there are produced about 89,600 Nm$^3$/hour of waste gas with a content of oxides of nitrogen of 265 mg./Nm$^3$.

Hydrated calcium cyanamide (particle size 90% < 160 μm.) is blown into the combustion chamber in an amount of 200 kg./hour with carrier air, saturated water vapor and water. The content of oxides of nitrogen in the waste gas is reduced to 90 mg./Nm$^3$, which corresponds to a degree of nitrogen removal of about 66%.

We claim:

1. The method of reducing emissions of sulphur dioxide, oxides of nitrogen or mixtures thereof from combustion processes by the addition of hydrated calcium cyanamide as the sole reagent, which comprises blowing hydrated particles of calcium cyanamide enveloped with a hydrate mantle from a mixing nozzle into the combustion chamber, with the aid of a carrier medium comprising air, water and water vapor, in the form of a droplet-powder fluidized bed.

2. The method of claim 1, wherein air in admixture with water vapor is used as carrier medium.

3. The method of claim 2, wherein, as carrier medium for the hydrated calcium cyanamide particles, there is used a mixture of saturated water vapor and water, together with air.

4. The method of claim 3, wherein the mixture of saturated water vapor and water is used in a ratio of from 10:1 to 1:10 and at a pressure of from 3 to 10 bar.

5. The method of claim 1, wherein the hydrated calcium cyanamide additive is used at a temperature of 300° to 1200° C.

6. The method of claim 1, wherein hydrated calcium cyanamide particles are used and to the carrier medium is added an amount of water which suffices to form a hydrate mantle on the particles before they enter into the combustion chamber.

7. The method of claim 1, wherein hydrated calcium cyanamide particles already covered with a hydrate mantle are brought together with the carrier medium.

8. The method of claim 1, wherein calcium cyanamide particles are used with a size of <250 μm.

9. The method of claim 8, wherein calcium cyanamide particles are used with a size of <160 μm.

10. The method of claim 1, wherein 0.5 to 10 g. of calcium cyanamide are used per Nm$^3$ of waste gas.

* * * * *